(12) United States Patent
Ginestra

(10) Patent No.: US 9,068,131 B2
(45) Date of Patent: Jun. 30, 2015

(54) CATALYST COMPOSITION AND A PROCESS THAT USES THE CATALYST COMPOSITION FOR THE HYDROCONVERSION OF A HEAVY HYDROCARBON FEEDSTOCK

(75) Inventor: Josiane Marie-Rose Ginestra, Richmond, TX (US)

(73) Assignee: Shell Oil Company, Houston, TX (US)

( * ) Notice: Subject to any disclaimer, the term of this patent is extended or adjusted under 35 U.S.C. 154(b) by 629 days.

(21) Appl. No.: 12/496,848

(22) Filed: Jul. 2, 2009

(65) Prior Publication Data

US 2010/0006475 A1 Jan. 14, 2010

Related U.S. Application Data

(60) Provisional application No. 61/078,078, filed on Jul. 3, 2008.

(51) Int. Cl.
*B01J 27/14* (2006.01)
*C10G 47/02* (2006.01)
*B01J 23/883* (2006.01)
*B01J 27/19* (2006.01)
*B01J 35/10* (2006.01)
*C10G 45/60* (2006.01)
*B01J 35/00* (2006.01)

(52) U.S. Cl.
CPC .............. *C10G 47/02* (2013.01); *B01J 23/883* (2013.01); *B01J 27/19* (2013.01); *B01J 35/002* (2013.01); *B01J 35/1019* (2013.01); *B01J 35/1042* (2013.01); *B01J 35/1061* (2013.01); *B01J 35/108* (2013.01); *C10G 45/60* (2013.01)

(58) Field of Classification Search
USPC .......................... 502/203, 210, 215, 259, 313
See application file for complete search history.

(56) References Cited

U.S. PATENT DOCUMENTS

| | | | |
|---|---|---|---|
| 2,687,370 A | 8/1954 | Hendricks | 196/28 |
| 5,186,904 A | 2/1993 | Lyzinski et al. | 422/130 |
| 2005/0101480 A1* | 5/2005 | Ackerman et al. | 502/313 |

FOREIGN PATENT DOCUMENTS

| | | | |
|---|---|---|---|
| EP | 1060794 | 12/2000 | B01J 35/10 |
| WO | WO2008016969 | * 2/2008 | |

* cited by examiner

*Primary Examiner* — Melvin C Mayes
*Assistant Examiner* — Colette Nguyen
(74) *Attorney, Agent, or Firm* — Charles W. Stewart

(57) ABSTRACT

A catalyst composition that provides for a high percentage conversion of the pitch component of a heavy hydrocarbon feedstock and a process of using the catalyst composition. The catalyst composition comprises a nickel component, a molybdenum component in an amount less than 12 wt % of the catalyst composition, and it may also include an alumina support material having special properties. The weight ratio of the nickel component-to-molybdenum component exceeds 0.25, and the support material preferably has a median pore diameter of from 100-140 Å. The catalyst composition has a characteristically unique Raman spectrum that distinguishes it over other compositions.

9 Claims, 7 Drawing Sheets

Figure 1:
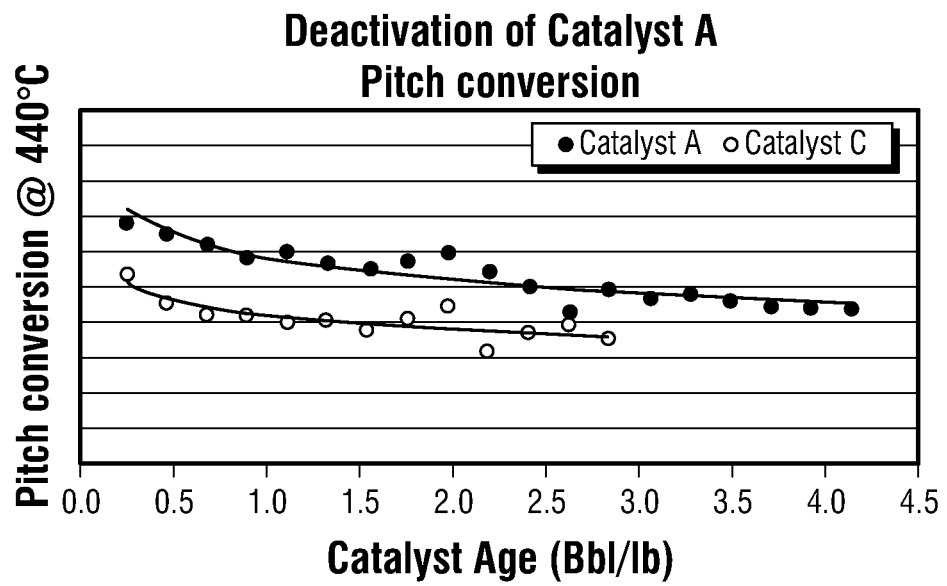

CATALYST COMPOSITION AND A PROCESS THAT USES THE CATALYST COMPOSITION FOR THE HYDROCONVERSION OF A HEAVY HYDROCARBON FEEDSTOCK

This application claims the benefit of U.S. Provisional Application No. 61/078,078 filed Jul. 3, 2008, the entire disclosure of which is hereby incorporated by reference.

The invention relates to a catalyst composition and use thereof in a process for the hydroprocessing of a heavy hydrocarbon feedstock.

There is an ongoing effort to find improved catalyst compositions that may suitably be used in hydroprocessing of heavy hydrocarbon feedstocks. A desirable property of these catalyst compositions includes having high stability in catalytic activity when used in the hydroprocessing of a heavy hydrocarbon feedstock. When these catalysts are used for the hydroconversion of heavy hydrocarbon feedstocks, it is desirable for them to provide for a high conversion of the pitch component, which is a heavy boiling fraction of the heavy hydrocarbon feedstock, to lighter and more valuable components. This conversion of the heavy boiling fraction of a heavy hydrocarbon feedstock requires consumption of hydrogen. It is also desirable for these catalysts to provide for a high conversion of the coke precursors of heavy hydrocarbon feedstocks, which are typically referred to as "Micro Carbon Residue," or MCR, in order to prevent the fouling of downstream process equipment and to provide other benefits.

Disclosed in Patent Publication US 2005/0101480 is a novel catalyst for use in the hydroprocessing of heavy hydrocarbon feedstocks. This publication teaches a hydroconversion catalyst made with a novel alumina support material having specifically defined physical properties and containing a Group VIII metal component and a Group VIB metal component. This hydroconversion catalyst is indicated as suitably providing for high percentage conversion of the pitch component of a heavy hydrocarbon feedstock, but there is no mention of the association between hydrogen consumption and a given pitch conversion.

Among the various properties that are desired in a hydroconversion catalyst when used in the hydroprocessing of a heavy hydrocarbon feedstock is that of having the ability to provide for a high conversion of the pitch content, or of the MCR, or both, of the heavy hydrocarbon feedstock but with a low hydrogen consumption. Thus, catalyst compositions having improved selectivity for either pitch conversion, or MCR conversion, or both, are desirable.

Accordingly, provided is a catalyst composition which is particularly suited for use in the hydroconversion of a heavy hydrocarbon feedstock and has various desirable properties, including, for example, the property of providing for a significantly high conversion of the pitch component of a heavy hydrocarbon feedstock with a reduced or lowered hydrogen consumption for a given pitch conversion than is typical with prior art catalysts.

The catalyst composition of the invention comprises a molybdenum component present in said catalyst composition in an amount of less than 12 wt. %, wherein the wt. % is based on the total weight of said catalyst composition and assuming said molybdenum component is in the oxide form regardless of its actual form; and a nickel component present in said catalyst composition in an amount such that said catalyst composition has a weight ratio of said nickel component-to-said molybdenum component exceeding 0.25, with said weight ratio computed assuming said nickel component and said molybdenum component are each in the oxide form regardless of their actual forms.

The catalyst composition of the invention can be used in a process for the hydroconversion of a heavy hydrocarbon feedstock, wherein said process comprises: contacting, under suitable hydroconversion conditions, said heavy hydrocarbon feedstock with the catalyst composition.

FIG. 1 presents plots of the percent pitch conversion as a function of catalyst age for an inventive Catalyst A and Comparative Catalyst C when used in a standard test of a heavy hydrocarbon feedstock hydroconversion capability.

Figure 2:
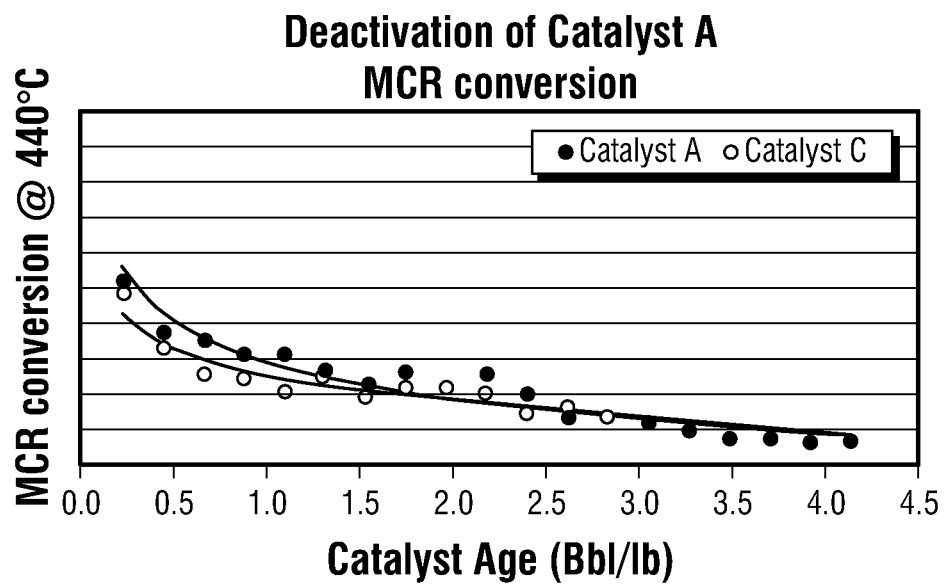

FIG. 2 presents plots of the micro carbon residue conversion as a function of catalyst age for the inventive Catalyst A and Comparative Catalyst C when used in the standard hydroconversion test.

Figure 3:
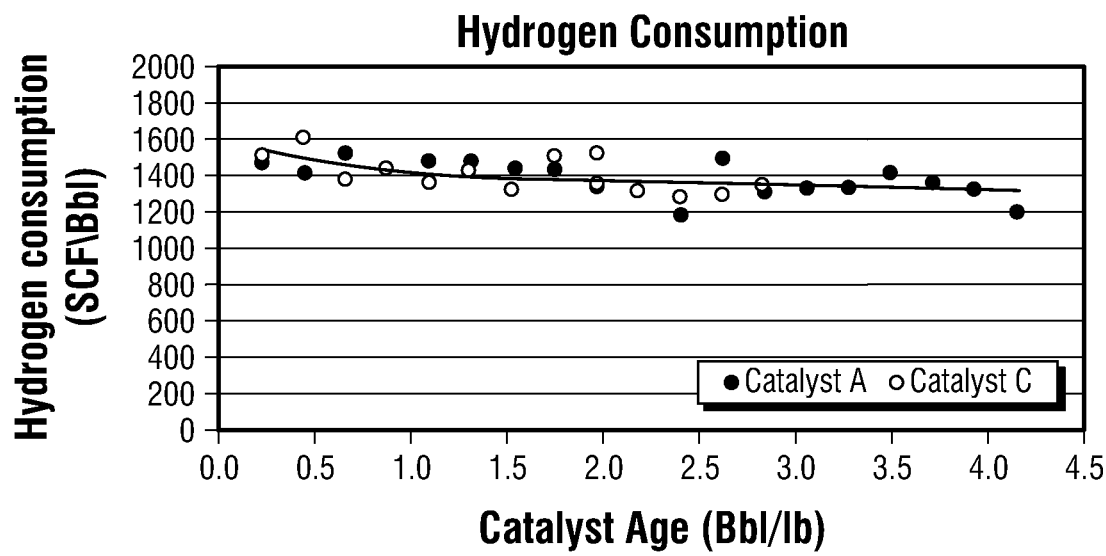

FIG. 3 presents plots of the hydrogen consumption as a function of catalyst age for the inventive Catalyst A and the Comparative Catalyst C when used in the standard hydroconversion test.

Figure 4:
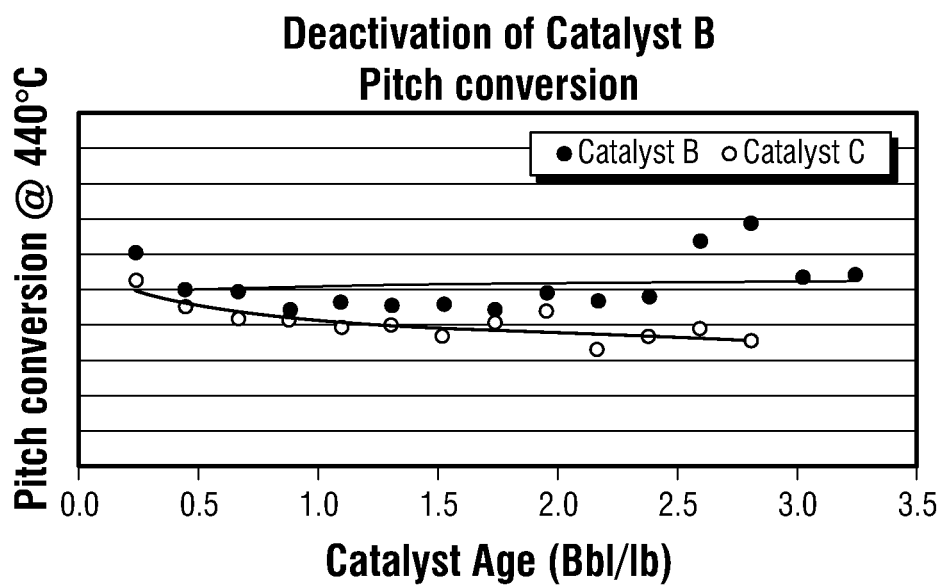

FIG. 4 presents plots of the percent pitch conversion as a function of catalyst age for an inventive Catalyst B and Comparative Catalyst C when used in a standard test of a heavy hydrocarbon feedstock hydroconversion capability.

Figure 5:
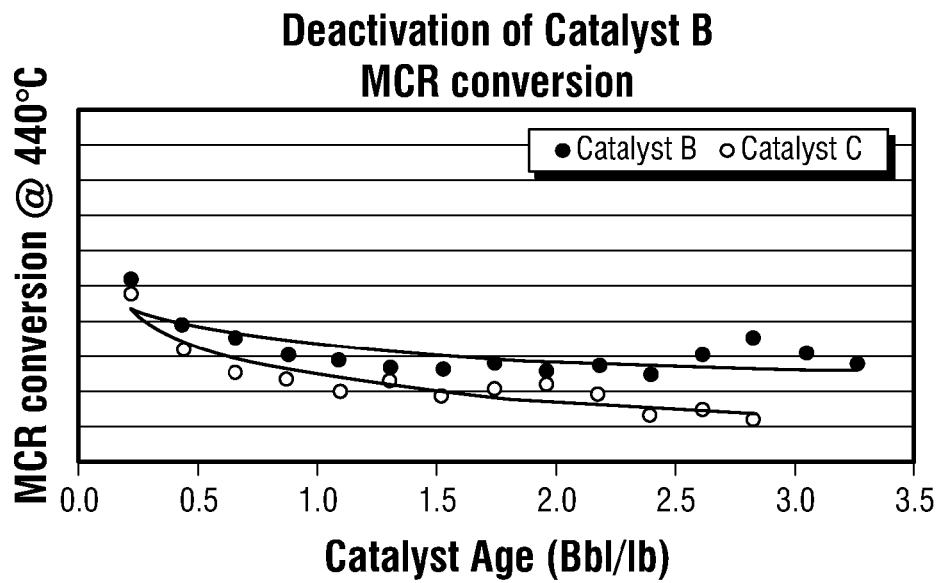

FIG. 5 presents plots of the micro carbon residue conversion as a function of catalyst age for the inventive Catalyst B and Comparative Catalyst C when used in the standard hydroconversion test.

Figure 6:
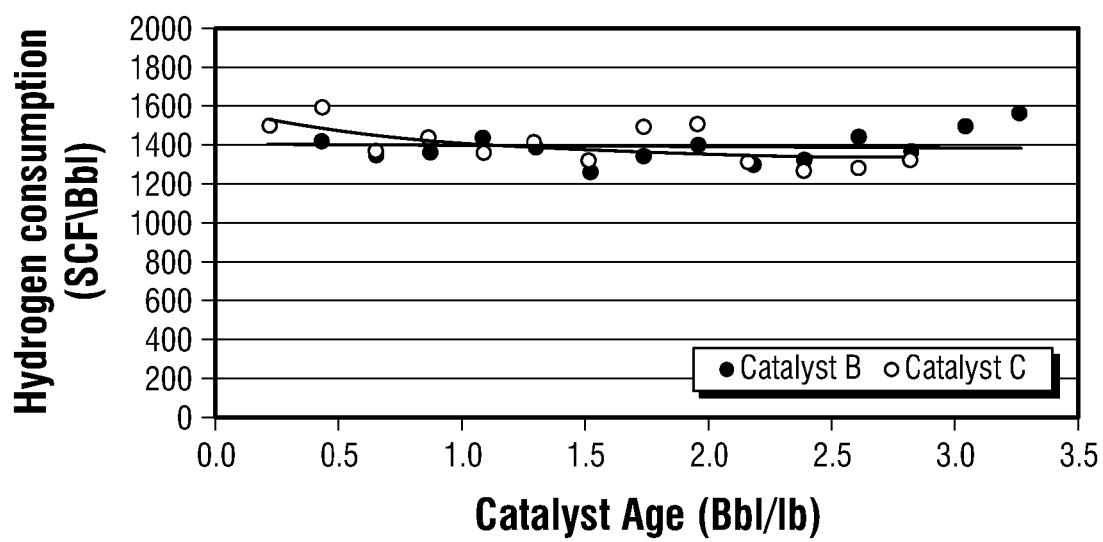

FIG. 6 presents plots of the hydrogen consumption as a function of catalyst age for the inventive Catalyst B and Comparative Catalyst C when used in the standard hydroconversion test.

Figure 7:
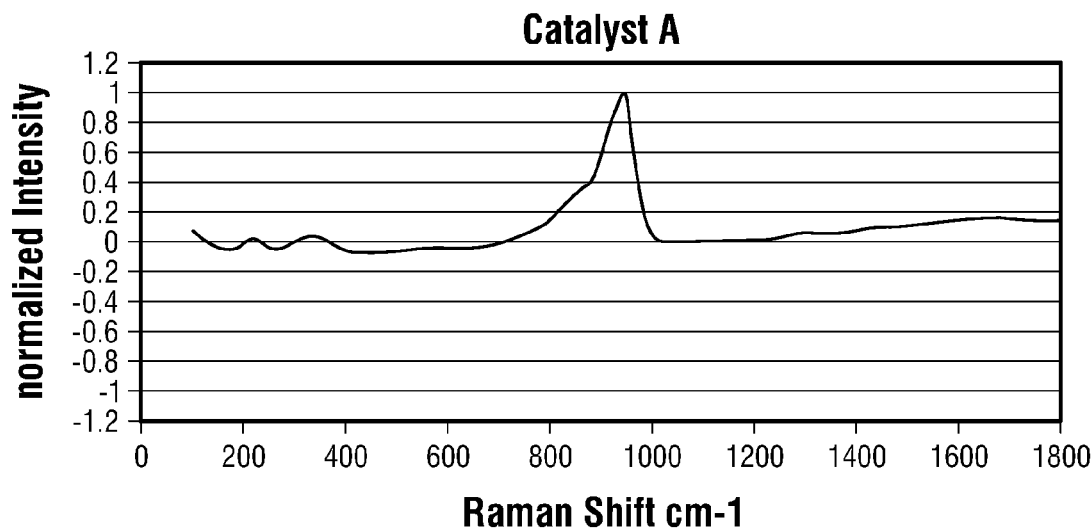

FIG. 7 presents the overall Raman spectrum of inventive Catalyst A. The Raman frequencies are scaled on the abscissa (x-coordinate) in the range of from approximately 100 $cm^{-1}$ to approximately 1800 $cm^{-1}$.

Figure 8:
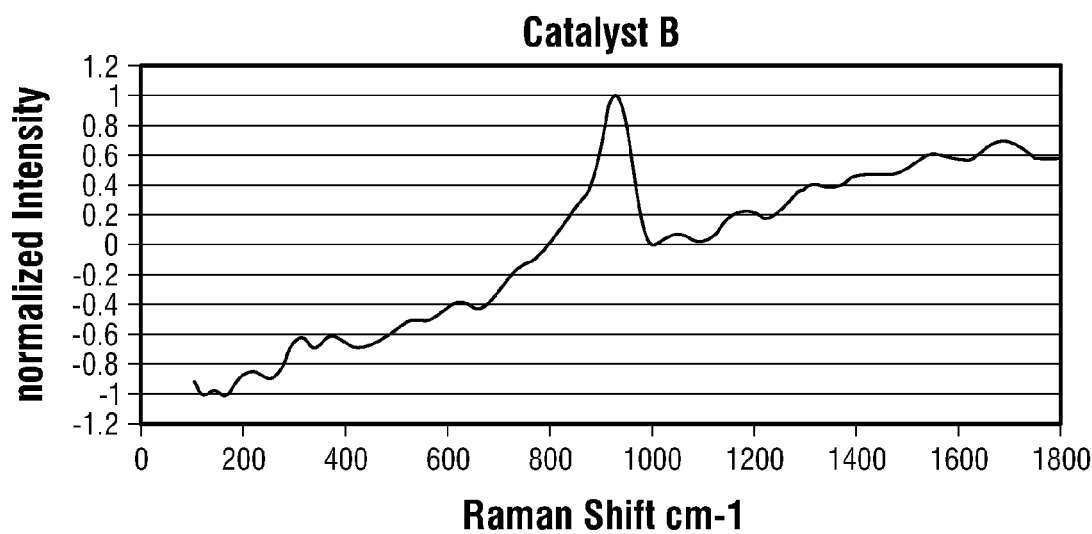

FIG. 8 presents the overall Raman spectrum of inventive Catalyst B. The Raman frequencies are scaled on the abscissa (x-coordinate) in the range of from approximately 100 $cm^{-1}$ to approximately 1800 $cm^{-1}$.

Figure 9:
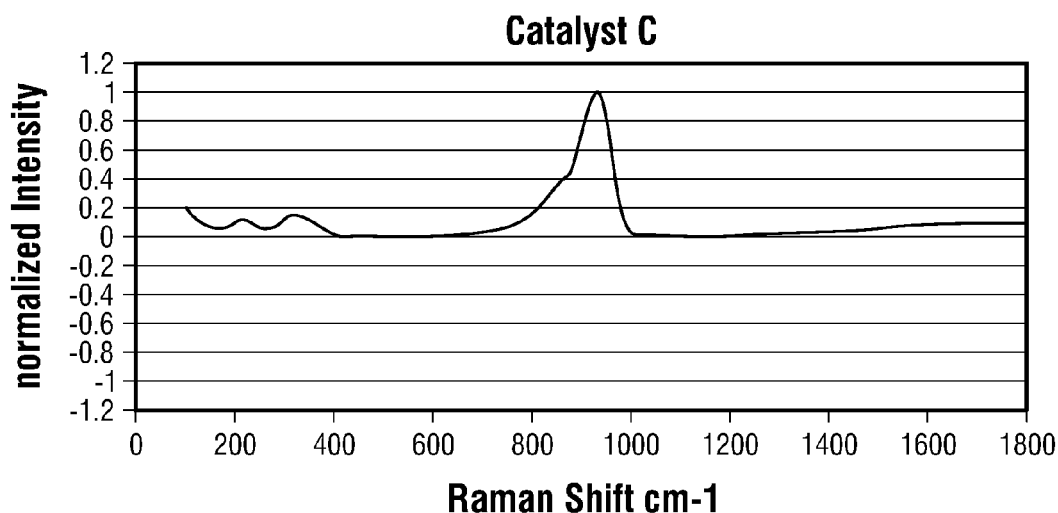

FIG. 9 presents the overall Raman spectrum of inventive Comparison Catalyst C. The Raman frequencies are scaled on the abscissa (x-coordinate) in the range of from approximately 100 $cm^{-1}$ to approximately 1800 $cm^{-1}$.

Figure 10:
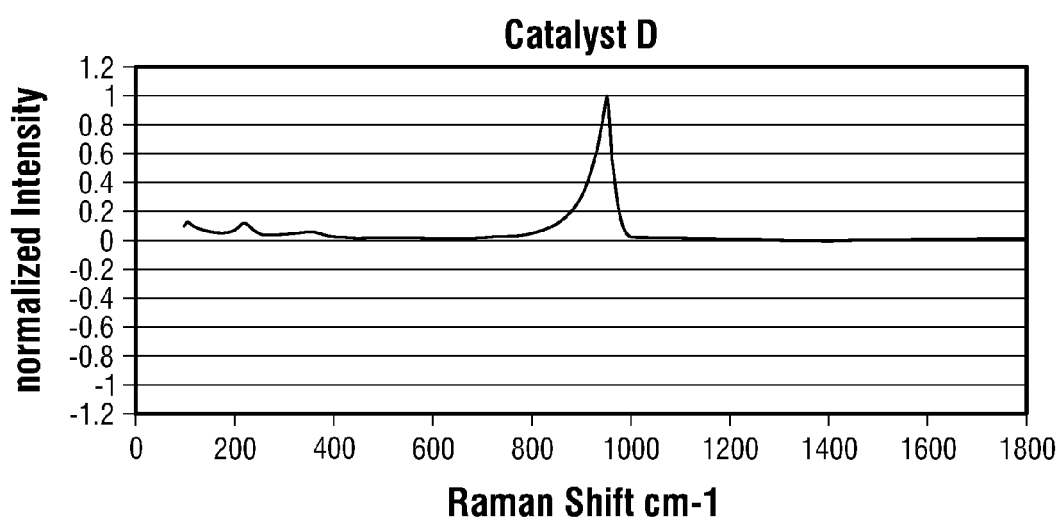

FIG. 10 presents the overall Raman spectrum of Comparison Catalyst D. The Raman frequencies are scaled on the abscissa (x-coordinate) in the range of from approximately 100 $cm^{-1}$ to approximately 1800 $cm^{-1}$.

Figure 11:
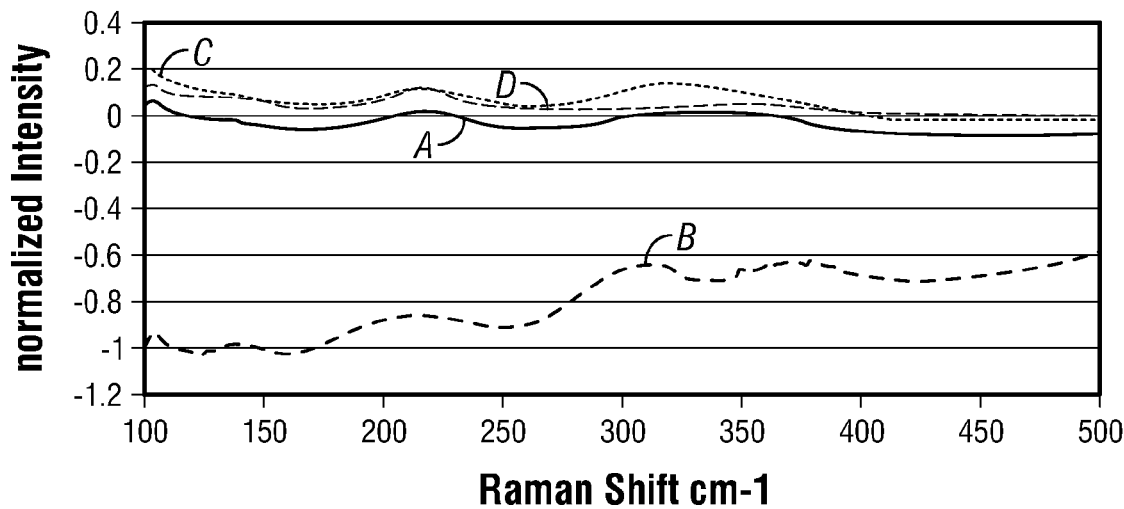

FIG. 11 presents enlarged portions of the low end (100 $cm^{-1}$ to 500 $cm^{-1}$ frequencies) of the Raman spectra of Catalyst A, Catalyst B, Comparative Catalyst C and Comparative Catalyst D.

Figure 12:
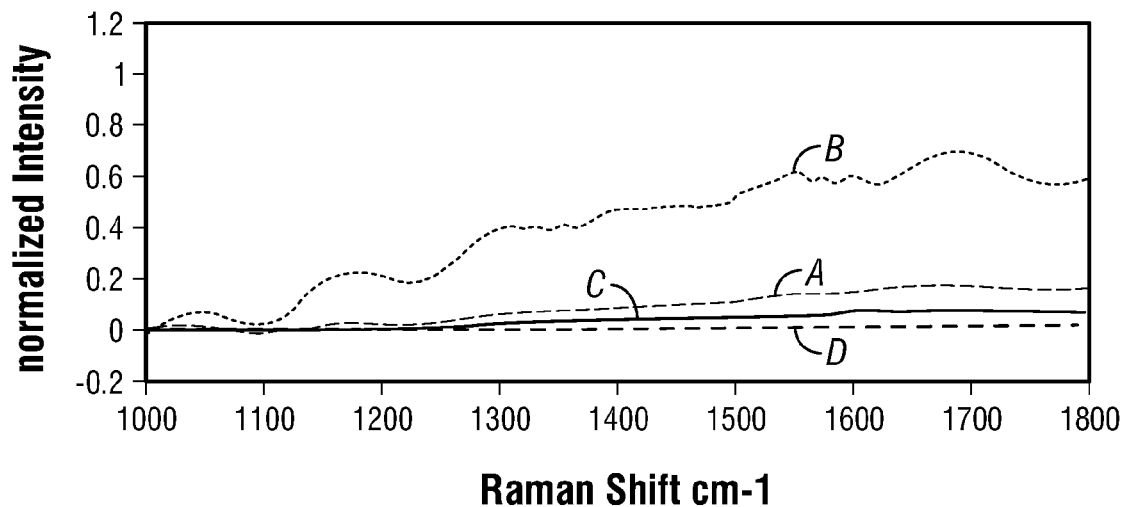

FIG. 12 presents enlarged portions of the high end (1000 $cm^{-1}$ to 1800 $cm^{-1}$ frequencies) of the Raman spectra of Catalyst A, Catalyst B, Comparative Catalyst C, and Comparative Catalyst D.

Figure 13:
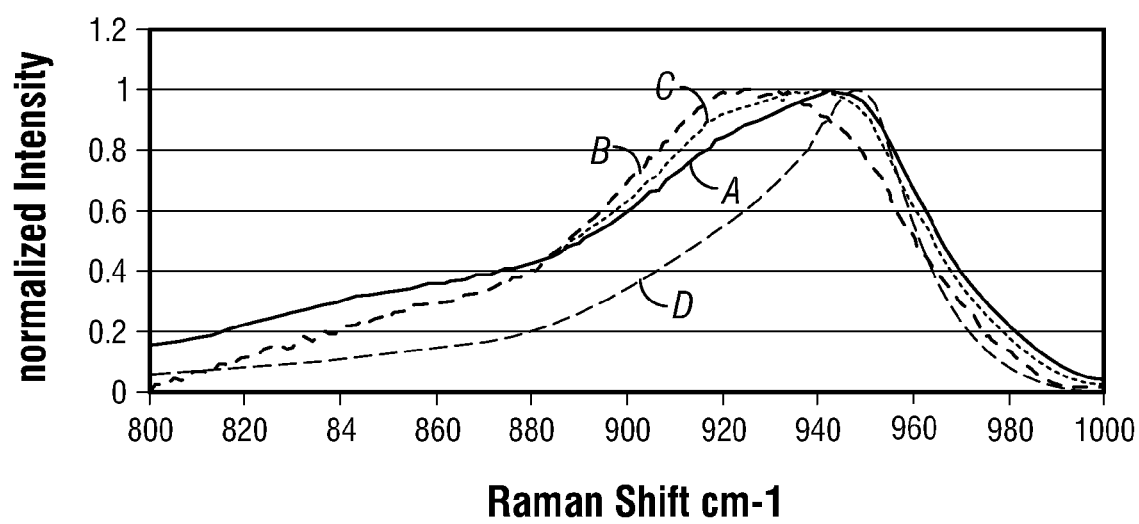

FIG. 13 presents enlarged portions of the intermediate range (800 $cm^{-1}$ to 1000 $cm^{-1}$ frequencies) of the Raman spectra of Catalyst A, Catalyst B, Comparative Catalyst C, and Comparative Catalyst D.

The inventive catalyst composition includes a molybdenum component and a nickel component, and, further, preferably, it includes a support material having specifically defined physical properties and contains alumina.

It has been found that, unexpectedly, the inventive catalyst composition, having a low molybdenum concentration and a high weight ratio of nickel-to-molybdenum present therein, and those embodiments of the catalyst having a particular alumina support material with special physical properties, have improved hydroconversion catalytic properties over other prior art compositions. Of significance is that the catalyst composition provides for a high pitch conversion of the pitch component of a heavy hydrocarbon feedstock but with a relatively low hydrogen consumption. The low molybdenum and high nickel-to-molybdenum weight ratio catalyst also is highly stable, and, thus, it deactivates at a significantly low rate even when used in the hydroprocessing of a heavy feedstock under difficult and reasonably severe hydroconversion process conditions that provide for the conversion of a heavy fraction of the heavy feedstock.

The low molybdenum with a high nickel-to-molybdenum weight ratio feature of the inventive catalyst is believed to contribute to the aforementioned improved performance properties regardless of the pore structure of the catalyst, but it is especially desirable for the support material of the catalyst to have certain specifically defined physical properties, and, in particular, for the support material to have a large proportion of its pore volume being present in pores within a narrow range of pore diameters and with the median pore diameter of the pores being within a certain, narrowly specified range of from 100 Å to 140 Å.

An alumina support material that is particularly suitable for use in the catalyst composition of the invention herein is the alumina support material as described in detail and claimed in U.S. Patent Publication No. US 2005/0101480, which the entire text thereof is incorporated herein by reference. This alumina support material may be manufactured using an alumina precursor as prepared by the preferred method that is both described and claimed in US 2005/0101480.

An additional desirable physical attribute to those described in US 2005/0101480 of the alumina support material that is to be used in the herein described inventive catalyst composition is for it to include a pore distribution that is further narrowed so that there is an absence of pore volume present in smaller pores.

The absence of pore volume should be such that there is less than 10% of the total pore volume of the alumina support material present therein that is contained in its pores having a pore diameter of less than 90 Å. It is even a more important aspect of the inventive catalyst composition for the pore distribution of the alumina support material to be very narrow such that less than 8% of the total pore volume of the alumina support material is present in the pores having a pore diameter of less than 90 Å, and, most preferably, less than 6.5% of the total pore volume is present in the pores having a pore diameter of less than 90 Å.

Consistent with the desire for the alumina support material to have a characteristically narrow pore distribution, it may further be desirable for the alumina support material to have an absence of pore volume that is present in the larger pores so that less than about 5% of the total pore volume of the alumina support material is present in the pores having pore diameters greater than 210 Å. It is particularly desirable for the alumina support material to have a minimum amount of macropores having pore diameters exceeding 210 Å, because such pores do not provide for the desired catalytic benefits required for the hydroconversion of a heavy hydrocarbon feedstock. Thus, to provide for the best results, it is best to minimize the amount of pore volume contained in the pores having pore diameters exceeding 210 Å to less than 3 percent, and, preferably, less than 1.5 percent, of the total pore volume of the alumina support material.

A further characteristic of the pore structure of the alumina support material is for it to have a "pore size distribution width" that is no more than 35 Å. While this term is defined and illustrated in U.S. Patent Publication No. US 2005/0101480, the definition is repeated herein to mean the smallest range of pore diameters of the pores of the alumina support material in which is present two-thirds of the total pore volume of the alumina support material. It is preferred for the alumina support material to have a pore size distribution width to be within an even more narrow range less than 30 Å, and, more preferably less than 25 Å.

The references herein to the pore size distribution and pore volume of the alumina support material are to those properties as determined by mercury penetration porosimetry. The measurement of the pore size distribution of the alumina support material is by any suitable mercury porosimeter capable of working in the pressure range between atmospheric pressure and about 60,000 psi, using a contact angle of 140° with a mercury surface tension of 474 dyne/cm at 25° C. Pore volume is defined as the total volume using the mercury intrusion method as measured between atmospheric pressure and a pressure of about 60,000 psia. The references herein to median pore diameter correspond to the median diameter by volume.

A critical feature of the inventive catalyst composition is for it to include a low molybdenum content while containing a reasonably high weight ratio of nickel-to-molybdenum. The catalytic performance benefit of having an enhanced pitch conversion with no significant increase in hydrogen consumption resulting from the low molybdenum and high nickel-to-molybdenum ratio is completely unexpected; because, one skilled in the art would normally expect to observe catalytic performance to decline with decreases in molybdenum content. Also, it has typically been believed that in hydroprocessing catalysts that contain both molybdenum and nickel components it is important for the amount of nickel present in the catalyst not be too excessively high relative to its molybdenum content, otherwise, the catalyst performance suffers.

The molybdenum component, therefore, can be present in the inventive catalyst composition in an amount of less than 12 wt. %. It is preferred for the molybdenum component to be present in the catalyst composition in an amount that is less than 10 wt. %, and, most preferred, it is present in an amount that is less than 7.5 wt. %. A practical lower limit for the molybdenum component of the catalyst composition is 5 wt. %, or, even, 6 wt. %. Thus, for example, the molybdenum component may be present in the catalyst composition in an amount in the range of from 5 to 12 wt. %. These weight percents (wt. %) are based on the total weight of the catalyst composition (i.e., the total weight includes the sum of all the individual components of the catalyst composition including the support material, metals, and any other components) and assuming that the molybdenum component is present in the oxide form, i.e., $MoO_3$, regardless of the actual form that it is in.

It is desirable for the catalyst composition to not include other Group VIB metals, such as, chromium and tungsten.

The amount of the nickel component contained in the catalyst composition should be such that the weight ratio of nickel-to-molybdenum is at least 0.25, with this weight ratio being computed assuming each of the nickel and molybdenum components being in their oxide forms (i.e., the weight ratio of $NiO/MoO_3$), regardless of their actual form. It is especially desirable for the nickel-to-molybdenum weight ratio to be at least 0.28, and, it is even more desirable for the weight ratio to be at least 0.3. A preferred weight ratio of nickel-to-molybdenum exceeds 0.35, and, an even more preferred weight ratio exceeds 0.4 or even 0.5. A practical upper limit for the weight ratio of nickel-to-molybdenum in the catalyst composition is no more than 0.9, but this upper limit may also be no more than 0.85, or even no more than 0.8. An example of a range for the nickel-to-molybdenum weight ratio in the catalyst composition is from 0.3 to 0.9.

It is notable that the nickel-to-molybdenum ratio contained in the inventive catalyst composition is reasonably high. It is believed that the combination of low molybdenum content and high nickel-to-molybdenum ratio are critical features of the catalyst composition in that they, in combination with the special properties of the alumina support material, provide for the unique catalytic performance properties of the inventive catalyst. It is quite unexpected that the combination of these features provide for a catalyst composition having enhanced pitch conversion capability with a correspondingly low hydrogen consumption; since, those skilled in the art would have thought that a reduction in molybdenum content would tend to result in a less catalytically active catalyst and that a high relative nickel content would tend to interact with the molybdenum at the atomic and molecular levels in undesirable ways.

The catalyst composition may also include, and, preferably does include, a phosphorous component. The amount of the phosphorous component in the catalyst composition can be in the range of from or about 0.1 (0.04 wt. % elemental phosphorous) to or about 6 wt. % (2.63 wt. % elemental phosphorous). Preferably, the phosphorous component is present in the catalyst composition in the range of from 0.5 wt % (0.22 wt. % elemental phosphorous) to 5 wt. % (2.19 wt. % elemental phosphorous), and, most preferably, from 0.75 (0.33 wt. % elemental phosphorous) to 4 wt % (1.75 wt. % elemental phosphorous). These weight percents (wt. %) are based on the total weight of the catalyst composition and assuming that the phosphorous component is present in the oxide form, i.e., $P_2O_5$, regardless of the form that it is actually in.

As noted above in describing the critical features of the catalyst composition, nickel is a necessary component of the catalyst composition, and, in certain embodiments of the inventive composition, it may further be desirable to exclude material amounts of certain of the other Group VIII metals (e.g., iron, nickel, cobalt, palladium, and platinum). In particular, in one specific embodiment of the inventive catalyst composition, it is desirable for the catalyst composition to have a material absence of cobalt. What is meant by having a material absence of cobalt is that the catalyst composition contains no amount of cobalt that materially affects the performance of the catalyst composition. Since it is believed that the significant presence of cobalt in the catalyst composition with its low molybdenum content and high weight ratio of nickel-to-molybdenum can negatively impact its catalytic effectiveness when used in applications involving the conversion of the pitch content of a heavy hydrocarbon feedstock, the cobalt should be absent from the catalyst composition. Thus, it is best for the cobalt to be present in the catalyst composition in an amount of no more than 0.1 wt. %, preferably, in an amount of no more than 0.05 wt. %, and, even in an amount of no more than 0.01 wt. %, or even in a negligible amount.

Considering the effect that cobalt and certain other of the Group VIII metals may have on the performance of the inventive catalyst composition, it may further consist essentially of the molybdenum component, the nickel component, and, optionally, the phosphorous component supported on the particularly defined alumina support material all in the proportions and concentrations as described herein.

The finished catalyst composition of the invention can have a surface area (determined by the nitrogen BET method) of at least 150 m²/g, and, preferably, at least 180 m²/g. The median pore diameter (determined by nitrogen desorption) of the catalyst composition can be in the range of from 80 Å to 140 Å, preferably, from 90 Å to 130 Å, and, more preferably, from 100 Å to 120 Å.

In addition to the physical and compositional characteristics of the inventive catalyst composition, it may further be defined by its unique performance characteristic of providing for a particularly high pitch conversion capability or micro carbon residue (MCR) conversion capability, or both.

As used in this specification, the term "pitch conversion capability" refers to the performance property of a catalyst composition when it is used in the catalytic hydroconversion of a heavy hydrocarbon feedstock in a standard test procedure as described below. The catalyst composition is tested under the standard testing conditions to determine for a specified feedstock the percentage of the pitch component of the feedstock that is converted to lower boiling components and the associated hydrogen consumption. The pitch conversion capability is a numerical value determined by dividing the percentage of converted pitch by the corresponding hydrogen consumption.

The standard test is performed using a laboratory scale reactor as depicted in FIG. 4 and further described in the specification of U.S. Pat. No. 5,186,904, which the entire text and figures thereof are incorporated herein by reference. The reactor is loaded with a measured sample of catalyst to be tested. The testing conditions under which the reactor is operated include a reaction temperature of 440° C., a pressure of 10.4 MPa, and a heavy hydrocarbon feed rate such that the liquid hourly space velocity is 1. The heavy hydrocarbon feed and a substantially pure hydrogen stream are charged to the reactor from which is yielded a product. The pitch conversion, MCR conversion, and hydrogen consumption is then determined.

The standard test method may be used to generate comparative test results, which may include those of two or more different catalyst samples tested under the same testing conditions using the same feedstock to yield their respective products. Under this comparative testing approach, the relative performance of the catalysts with respect to the treatment of a particular feedstock is determined instead of the absolute performance of the catalyst samples with respect to a standard feedstock.

The standard test method may also be used to generate what is consider herein to be an absolute performance measurement of a catalyst sample with respect to a standard feedstock. The standard feedstock for use in determining the absolute performance measurement is a heavy hydrocarbon feedstock having a pitch component (i.e., hydrocarbon molecules having a boiling temperature above 524° C.) of approximately 70 volume percent of the heavy hydrocarbon feedstock, and an API gravity in the range of from 4 to 7.

One distinctive property of the inventive catalyst composition is its absolute pitch conversion capability. A fresh sample of the catalyst composition can have an absolute pitch conversion capability that is in the range of from 0.16 to 0.25 (% pitch conversion per standard liter of hydrogen consumption per standard liquid liter of feedstock). More specifically, the fresh catalyst composition can exhibit an absolute pitch conversion capability that is in the range of from 0.17 to 0.23, and, most specifically, it is in the range of from 0.18 to 0.21.

The catalyst composition of the invention further exhibits Raman spectral characteristics that distinguish it over prior art catalysts that do not have its low molybdenum concentration and high nickel-to-molybdenum weight ratio and other characteristic features. The inventive catalyst is distinguishable over other catalysts in that it is characterized by a Raman spectrum having at least two Raman peaks with maxima within the overall Raman region of from about 275 cm$^{-1}$ to about 400 cm$^{-1}$. These peaks are in the Raman regions of from 290 cm$^{-1}$ to 330 cm$^{-1}$ and from 350 cm$^{-1}$ to 390 cm$^{-1}$. Or, preferably, from 300 cm$^{-1}$ to 320 cm$^{-1}$ and from 360 cm$^{-1}$ to 380 cm$^{-1}$, and, more preferably, 305 cm$^{-1}$ to 315 cm$^{-1}$ and from 365 cm$^{-1}$ to 375 cm$^{-1}$.

The inventive catalyst may further be characterized by a Raman spectrum that includes one or more Raman peaks within one or more of the Raman regions that include the range of from 1130 cm$^{-1}$ to 1230 cm$^{-1}$, and/or the range of from 1250 cm$^{-1}$ to 1350 cm$^{-1}$, and/or the range of from 1360 cm$^{-1}$ to 1440 cm$^{-1}$, and/or the range of from 1500 cm$^{-1}$ to 1600 cm$^{-1}$, and/or the range of from 1610 cm$^{-1}$ to 1750 cm$^{-1}$. It is more preferred for the inventive catalyst to exhibit characteristic Raman peaks within one or more of the Raman regions that include the range of from 1140 cm$^{-1}$ to 1220 cm$^{-1}$, and/or the range of from 1260 cm$^{-1}$ to 1340 cm$^{-1}$, and/or the range of from 1380 cm$^{-1}$ to 1420 cm$^{-1}$, and/or the range of from 1520 cm$^{-1}$ to 1580 cm$^{-1}$, and/or the range of from 1630 cm$^{-1}$ to 1730 cm$^{-1}$. It is most preferred that the Raman peaks be within one or more of the Raman regions that include the range of from 1150 cm$^{-1}$ to 1210 cm$^{-1}$, and/or the range of from 1280 cm$^{-1}$ to 1320 cm$^{-1}$, and/or the range of from 1390 cm$^{-1}$ to 1410 cm$^{-1}$, and/or the range of from 1530 cm$^{-1}$ to 1570 cm$^{-1}$, and/or the range of from 1650 cm$^{-1}$ to 1710 cm$^{-1}$.

It is noted that the frequencies of the Raman spectrum mentioned above are given as Raman shifts abbreviated as cm$^{-1}$, thus, they are actually differential values between an excitation wavelength and a detected wavelength.

The Raman spectrum is to be as measured using a conventional laboratory Raman spectrometer (such as a Horiba Jobin Yvon LabRAM spectrometer or a Horiba Jobin Yvon double or triple Raman spectrometer or a ThermoFisher Scientific Almega XR Raman spectrometer) under the conditions that include: an excitation wavelength of between 215 and 1080 nanometers with laser powers at the sample up to 1 Watt. Typical conditions include excitation at 4880 or 5145 nm from an argon ion laser with 30 to 60 milliwatts at the sample. The Raman spectrometer should be capable of a spectral resolution of less than 2 nm/mm.

The catalyst composition may be prepared by incorporating the metal components into the alumina support material by any suitable means or method known to those skilled in the art followed by drying, or calcining, or both, to yield the catalyst composition of the invention. As earlier mentioned, one of the important features of the invention is for the alumina support material of the catalyst composition to have specifically defined physical properties, which include having a median pore diameter that is within a very narrow range and a small proportion of the total pore volume that is contained in the macropores and in the pores having a pore diameter of less than 90 Å.

Also, the composition of the alumina support material ought to contain little, if any, silica. Thus, the support material may have a substantial or material absence of silica.

One desirable method of preparing the alumina support material is described in detail in the above-noted patent publication US 2005/0101480. Generally, the alumina support material of the inventive catalyst composition is prepared by mixing water and a suitable alumina or alumina precursor powder and a peptizing agent to thereby form a mixture having suitable properties that allow for its agglomeration into particles, such as, for example, extrudate particles, that are then dried and calcined to yield the alumina support material into which the metals are incorporated.

The metal components of the inventive catalyst composition are incorporated into the alumina support material by any suitable means or method known to those skilled in the art including those described in the patent publication US 2005/0101480. An essential aspect of the invention is for the nickel and molybdenum metal components to be present in the catalyst composition in the amounts and relative proportions as described above. So, the metal components or precursors thereof are incorporated into the alumina support material in the appropriate amounts, and, thereafter, the alumina support material, which has incorporated therein the metal components, is dried, or calcined, or both, to thereby yield the final catalyst composition of the invention.

While the catalyst composition of the invention may be used in a wide range of catalytic applications, including, for example, uses in the hydroprocessing (e.g., hydrotreating, hydrodenitrogenation, hydrodesulfurization, hydrodemtalization, and etc.) of hydrocarbon feedstocks that are derived from crude oils (e.g., naphtha, kerosene, diesel, gas oils, resids, and etc.), it is particularly useful, as already noted herein, in the hydrotreating and hydroconversion of a heavy hydrocarbon feedstock. And, relative to certain other comparative catalysts, the catalyst composition provides superior results in the hydroconversion of the pitch component of heavy hydrocarbon feedstocks with a significantly higher pitch conversion and a notably favorable associated hydrogen consumption (i.e., the catalyst composition provides for a higher percentage pitch conversion with equivalent hydrogen consumption relative to prior art catalysts or, alternatively, it provides an equivalent percentage pitch conversion with a lower hydrogen consumption relative to prior art catalysts).

The catalyst composition of the invention is especially useful as an ebullated bed catalyst used in the hydroconversion of heavy hydrocarbon feedstocks in ebullated bed reactor systems similar to the one described in patent publication US 2005/0101480, which patent publication is incorporated herein by reference.

The heavy hydrocarbon feedstock of the invention can be obtained from any suitable source of hydrocarbons, including, for example, petroleum crude oils and tar sand hydrocarbons, such as, heavy oils extracted from tar sand. The heavy hydrocarbon feedstock can be a vacuum resid or atmospheric resid component of a petroleum crude oil or tar sand hydrocarbon. It is preferred for the source of the heavy hydrocarbon feedstock to be from an oil sand, such as any of those that are recovered in many areas of Canada, that have been topped by atmospheric distillation and vacuum distilled.

The heavy hydrocarbon feedstock can further include high concentrations of sulfur and nitrogen compounds and metals, such as, nickel and vanadium. Indeed, it is the high concentrations of metal, sulfur and nitrogen compounds in addition to the high molecular weight of the heavy hydrocarbon feedstock that make its hydrotreatment so challenging.

The heavy hydrocarbon feedstock, thus, includes a mixture of hydrocarbons derived from a crude oil or tar sand hydrocarbon material or other source of heavy hydrocarbons. A portion, preferably a major portion, of the heavy hydrocarbons of the mixture has a boiling temperature exceeding about 343° C. (650° F.). The heavy hydrocarbon feedstock is thus defined as having a boiling range, as determined by ASTM test procedure D-1160, such that at least about 30 weight percent of the heavy hydrocarbon feedstock boils at a temperature exceeding 524° C. (975° F.). The preferred heavy hydrocarbon feedstock has a boiling range such that at least 40 weight percent boils at a temperature exceeding 524° C.

(975° F.), and, most preferably, at least 50 weight percent of the heavy hydrocarbon feedstock boils at a temperature exceeding 524° C. (975° F.).

The API gravity of the heavy hydrocarbon feedstock can range from about 3 to about 20, but, more specifically, the API gravity is in the range of from 4 to 15, and, most specifically, from 4 to 11.

The heavy hydrocarbon feedstock can have a Conradson carbon content, as determined by ASTM testing method D-189, exceeding 5 weight percent, and, more specifically, the Conradson carbon content is in the range of from 8 weight percent to 30 weight percent.

The heavy hydrocarbon feedstock can also have a micro carbon residue (MCR) content, as determined by ASTM testing method D-4530, exceeding 10 weight percent, and, more specifically, the MCR content exceeds 12 weight percent, and, most specifically, it exceeds 14 weight percent.

The heavy hydrocarbon feedstock can also comprise sulfur compounds in amounts such that the concentration of sulfur in the heavy hydrocarbon feedstock exceeds about 2 weight percent and even exceeds 3 weight percent. More specifically, the sulfur concentration in the heavy hydrocarbon feedstock can be in the range of from 4 to 10 weight percent.

The heavy hydrocarbon feedstock can further comprise nitrogen compounds in amounts such that the concentration of nitrogen in the heavy hydrocarbon feedstock exceeds 0.1 weight percent and even exceeds 0.2 weight percent. More specifically, the nitrogen concentration in the heavy hydrocarbon feedstock can be in the range of from 0.3 to 3 weight percent.

As earlier noted, the metals contained in the heavy hydrocarbon feedstock can include nickel or vanadium, or both. The nickel concentration in the heavy hydrocarbon feedstock can exceed 10 parts per million by weight (ppmw) or it can exceed 30 ppmw. More specifically, the nickel concentration in the heavy hydrocarbon feedstock can be in the range of from 40 ppmw to 500 ppmw. The vanadium concentration in the heavy hydrocarbon feedstock can exceed 50 ppmw or it can exceed 100 ppmw. More specifically, the vanadium concentration in the heavy hydrocarbon feedstock can be in the range of from 150 ppmw to 1500 ppmw.

The process of the invention includes contacting the heavy hydrocarbon feedstock, preferably in the presence of hydrogen, with the catalyst composition of the invention under suitable hydroprocessing conditions. The inventive process provides for an exceptionally high percentage conversion of the pitch component of the heavy hydrocarbon feedstock with a relatively low corresponding hydrogen consumption.

As used herein, the term "pitch" refers to the hydrocarbon molecules contained in the fraction of the heavy hydrocarbon feedstock that boil at temperatures above 524° C. (975° F.). The references herein to "pitch conversion" or similar references to the conversion of pitch, are speaking of the cracking of the heavy hydrocarbon molecules that make up the pitch component of the heavy hydrocarbon feedstock to smaller hydrocarbon molecules that boil at temperatures below 524° C. (975° F.).

The percent conversion of pitch is then defined as being the weight percent of the pitch contained in the heavy hydrocarbon feedstock that is converted by the hydroconversion process, and it can be represented by the ratio of the difference between the weight of pitch in a feed and the weight of pitch in the product with the difference divided by the weight of pitch in the feed with the resulting ratio being multiplied by 100 to provide the percentage pitch conversion.

The hydroconversion process can be carried out by the use of any suitable reaction means or system including fixed bed, moving bed, fluidized bed and ebullated bed reactor systems. While the hydroconversion catalyst can be used as a part of any suitable reactor system, its properties make it particularly suitable for use in ebullated bed systems. For instance, the catalyst composition of the invention can be formed into particles that provide for a bulk density which make the hydroconversion catalyst especially effective for use as the catalyst component of an ebullated bed system.

The hydroprocessing conditions under which the heavy hydrocarbon feedstock is contacted with the hydroconversion catalyst composition include those process conditions that are effective in providing for a hydrotreated product and, preferably, that are effective in the conversion of at least a portion of the pitch component of the heavy hydrocarbon feedstock. The conversion of the pitch component can exceed about 50 weight percent of the pitch. A higher pitch conversion is desirable and, thus, preferably, pitch conversion exceeds 55 weight percent, and, most preferably, pitch conversion exceeds 60 weight percent.

The inventive catalyst composition can suitably provide for a high pitch conversion and relatively low hydrogen consumption such that the percentage pitch conversion per standard liter of hydrogen consumption per liquid liter of heavy hydrocarbon feedstock exceeds 0.16. Preferably, the percentage pitch conversion per standard liter of hydrogen consumption per liquid liter of heavy hydrocarbon feedstock exceeds 0.17, and, most preferably, it exceeds 0.18

Suitable hydroprocessing conditions under which the heavy hydrocarbon feedstock is contacted with the hydroconversion catalyst composition of the invention can include a hydroconversion contacting temperature in the range of from about 300° C. (572° F.) to about 700° C. (1292° F.), a hydroconversion total contacting pressure in the range of from about 500 psia to about 6,000 psia, which includes a hydrogen partial pressure in the range of from about 500 psia to about 3,000 psia, a hydrogen addition rate per volume of heavy hydrocarbon feedstock in the range of from about 500 SCFB to about 10,000 SCFB, and a hydroconversion liquid hourly space velocity (LHSV) in the range of from about 0.2 hr$^{-1}$ to 5 hr$^{-1}$.

The preferred hydroconversion contacting temperature is in the range of from 310° C. (590° F.) to 650° C. (1202° F.), and, most preferred, from 316° C. (600° F.) to 600° C. (1112° F.). The preferred hydroconversion total contacting pressure is in the range of from 500 psia to 2,500 psia, most preferably, from 500 psia to 2,000 psia, with a preferred hydrogen partial pressure of from 800 psia to 2,000 psia, and most preferred, from 1,000 psia to 1,800 psia. The LHSV is preferably in the range of from 0.2 hr$^{-1}$ to 4 hr$^{-1}$, and, most preferably, from 0.2 hr$^{-1}$ to 3 hr$^{-1}$. The hydrogen addition rate is preferably in the range of from 600 SCFB to 8,000 SCFB, and, more preferably, from 700 SCFB to 6,000 SCFB.

The unique properties of the inventive catalyst composition allow for a significant improvement in the operation of existing hydroconversion process systems by the replacement of the catalyst that has been used in such systems with the inventive catalyst composition that exhibits the above-described enhanced hydroconversion properties.

An existing hydroconversion process system includes a reactor vessel that defines a reaction zone, which can contain a bed of particles of a first hydrotreating catalyst. The first hydrotreating catalyst may be useful in the hydrotreating and hydroconversion of heavy hydrocarbon feedstocks and can have a pitch conversion capability. The reactor vessel is operatively equipped with means for receiving a heavy hydrocarbon feedstock having a pitch content, and, further, the reactor vessel provides means for contacting the heavy hydrocarbon feedstock, under hydroconversion conditions, with the hydrotreating catalyst in the presence of hydrogen to thereby provide a hydrotreated product. The reactor vessel also is operatively equipped with means for yielding therefrom the hydrotreated product.

The operation of the existing hydroconversion process system is improved after its use in the hydroconversion of a feedstock by removing at least a portion of the first hydrotreating catalyst from the reactor vessel and replacing it with particles of a second hydrotreating catalyst. Preferably, the second hydrotreating catalyst has a pitch conversion capability that is greater than that of the first hydrotreating catalyst, and, preferably, it includes the inventive catalyst composition as described in detail herein.

The following Examples are presented to illustrate the invention, but they should not be construed as limiting the scope of the invention.

EXAMPLE 1

This Example 1 describes the preparation of the inventive catalyst and the comparison catalyst that were tested for performance as described in Example 2.

The alumina support used in the preparation of the catalysts A and B was prepared by mixing alumina powder with water and a dilute nitric acid to form a suitable extrudable paste. The extrudable paste was formed into extrudates having a nominal diameter of 0.8 mm. The extrudates were dried at a drying temperature followed by calcination at a calcination temperature of 482° C. (900° F.). The pore size distribution of this alumina support as determined by mercury porosimetry is presented in the following Table 1. The median pore diameter is 116 Å, the average pore diameter is 119 Å, and the total intrusion volume is 0.8423 ml/g.

TABLE 1

Pore size distribution of alumina support material.

| Diameter (Angstroms) | Percentage | Cumulative Percentage |
| --- | --- | --- |
| Less than 50 | 0.65 | 99.35 |
| 50-60 | 0.59 | 98.75 |
| 60-70 | 0.83 | 97.92 |
| 70-80 | 1.38 | 96.55 |
| 80-90 | 2.91 | 93.64 |
| 90-100 | 6.99 | 86.64 |
| 100-110 | 16.51 | 70.13 |
| 110-120 | 34.26 | 35.87 |
| 120-130 | 23.46 | 12.41 |
| 130-140 | 5.21 | 7.19 |
| 140-150 | 0.96 | 6.23 |
| 150-160 | 0.59 | 5.64 |
| 160-170 | 0.46 | 5.18 |
| 170-180 | 0.38 | 4.80 |
| 180-210 | 0.85 | 3.94 |
| 210-280 | 1.06 | 2.88 |
| 280-350 | 0.56 | 2.33 |
| Greater than 350 | 2.33 | |
| Greater than 250 | 3.25 | |

Catalyst A

A nickel, phosphorous, and molybdenum impregnation solution was prepared by mixing the ingredients of 896 weight parts nickel carbonate ($NiCO_3$), 1335 weight parts molybdenum trioxide ($MoO_3$), 331 weight parts phosphoric acid ($H_3PO_4$), 451 weight parts citric acid monohydrate, and 13000 weight parts water and heating the mixture to approximately 93° C. (200° F.) and stirring until the liquid was clear. After cooling the impregnation solution, the alumina support extrudate described above was impregnated with an aliquot of the impregnation solution in such an amount so as to provide a catalyst composition, after impregnation and calcination, having a desired composition. The impregnated extrudate was dried at 125° C. for 3 to 4 hours followed by calcination for 1 hour at 483° C. (900° F.) to yield the final catalyst composition. This final catalyst composition had the final metals content of 2.4 wt. % nickel (3.05 wt. % NiO), 6 wt. % molybdenum (9 wt. % $MoO_3$), 0.6 wt. % phosphorous (1.37 wt. % $P_2O_5$) and 86.57 wt. % alumina ($Al_2O_3$). The nickel oxide-to-molybdenum oxide (NiO/$MoO_3$) of this catalyst is 0.34. The final catalyst composition also had the following properties: a nitrogen surface area (BET method) of 212 $m^2$/g; a nitrogen desorption pore volume (BJH method) of 0.697 cc/g; a nitrogen desorption mean pore diameter (BHJ method) of 105 Å; a mercury pore volume of 0.6764 cc/g; and a percent of the catalyst total pore volume in the pores having a pore diameter of more than 210 Å if 2.4%.

Catalyst B

A nickel, phosphorous, and molybdenum impregnation solution was prepared by mixing the ingredients of 877 weight parts nickel carbonate (NiCO3), 1046 weight parts molybdenum trioxide ($MoO_3$), 324 weight parts phosphoric acid ($H_3PO_4$), 488 weight parts citric acid monohydrate, and 13000 weight parts water and heating the mixture to approximately 93° C. (200° F.) and stirring until the liquid was clear. After cooling the impregnation solution, the alumina support extrudate was impregnated with an aliquot of the impregnation solution in such an amount so as to provide a catalyst composition, after impregnation and calcination, having a desired composition. The impregnated extrudate was dried at 125° C. for 3 to 4 hours followed by calcination for 1 hour at 483° C. (900° F.) to yield the final catalyst composition. This final catalyst composition had the final metals content of 2.4 wt. % nickel (3.05 wt. % NiO), 4.8 wt. % molybdenum (7.2 wt. % $MoO_3$), 0.6 wt. % phosphorous (1.37 wt. % $P_2O_5$) and 88.37 wt. % alumina ($Al_2O_3$). The nickel oxide-to-molybdenum oxide (NiO/$MoO_3$) of this catalyst is 0.42. The final catalyst composition also had the following properties: a nitrogen surface area (BET method) of 217 $m^2$/g; a nitrogen desorption pore volume (BJH method) of 0.7163 cc/g; a nitrogen desorption mean pore diameter (BHJ method) of 105 Å; a mercury pore volume of 0.6942 cc/g; and a percent of the catalyst total pore volume in the pores having a pore diameter of more than 210 Å if 2.5%.

Comparison Catalyst C

A nickel, phosphorous, and molybdenum impregnation solution was prepared by mixing the ingredients of 672 weight parts nickel carbonate ($NiCO_3$), 1500 weight parts molybdenum trioxide ($MoO_3$), 331 weight parts phosphoric acid ($H_3PO_4$), and 13000 weight parts water and heating the mixture to approximately 93° C. (200° F.) and stirring until the liquid was clear. After cooling the impregnation solution, the alumina support extrudate described above was impregnated with an aliquot of the impregnation solution in such an amount so as to provide a catalyst composition, after impregnation and calcination, having a desired composition. The impregnated extrudate was dried at 125° C. for 3 to 4 hours followed by calcination for 1 hour at 483° C. (900° F.) to yield the final catalyst composition. This final catalyst composition had the final metals content of 1.8 wt. % nickel (2.3 wt. % NiO), 6.5 wt. % molybdenum (9.75 wt. % $MoO_3$), 0.6 wt. % phosphorous (1.37 wt. % $P_2O_5$) and 86.58 wt. % alumina ($Al_2O_3$). The nickel oxide-to-molybdenum oxide (NiO/$MoO_3$) of this catalyst is 0.23.

Comparison Catalyst D

A nickel, phosphorous, and molybdenum impregnation solution was prepared by mixing the ingredients of 821 weight parts nickel carbonate ($NiCO_3$), 2105 weight parts molybdenum trioxide ($MoO_3$), 410 weight parts phosphoric acid ($H_3PO_4$), and 13000 weight parts water and heating the mixture to approximately 93° C. (200° F.) and stirring until the liquid was clear. After cooling the impregnation solution, the alumina support extrudate described above was impregnated with an aliquot of the impregnation solution in such an amount so as to provide a catalyst composition, after impregnation and calcination, having a desired composition. The impregnated extrudate was dried at 125° C. for 3 to 4 hours followed by calcination for 1 hour at 483° C. (900° F.) to yield the final catalyst composition. This final catalyst composition had the final metals content of 2.1 wt. % nickel (2.7 wt. % NiO), 8.7 wt. % molybdenum (13.05 wt. % $MoO_3$), 0.7 wt. % phosphorous (1.6 wt. % $P_2O_5$) and 82.67 wt. % alumina ($Al_2O_3$). The nickel oxide-to-molybdenum oxide ($NiO/MoO_3$) of this catalyst is 0.20.

EXAMPLE 2

This Example 2 describes the experimental testing procedure and conditions used to test the catalysts described in Example 1 for their hydroconversion performance properties.

Each of the catalysts A, B and comparison was tested for its catalytic performance in the hydroprocessing and hydroconversion of a heavy hydrocarbon feed. This feed was a blend of 40 vol % bitumen derived atmospheric distillation tower bottoms (atmospheric topped bitumen) and 60 vol % vacuum topped bitumen. The composition and properties of the atmospheric topped bitumen and the blend are presented in the Table 2 below.

The tests were conducted in a mini ebullated bed reactor as depicted in FIG. 4 of U.S. Pat. No. 5,186,904 and described in detail therein. The reactor was filled with 80 cc of the relevant catalyst, and the reactor was charged with the heavy hydrocarbon feed at a rate of 130 g/hour and with hydrogen at a rate of 104 standard (temperature is 25° C., pressure 1 atm.) liters per hour. The reaction conditions were maintained at 10.4 MPa and 440° C.

TABLE 2

Heavy Hydrocarbon Feed Properties and Composition

| Property | Atmospheric Topped Bitumen | Blend of Atmospheric Topped & Vaccum Topped Bitumen |
|---|---|---|
| Density, °API/sg | 6.5/1.025 | 4.5/1.040 |
| Sulphur, wt % | 5.0 | 5.3 |
| Nitrogen, wppm | 5000 | 5300 |
| MCR, wt % | 14.9 | 18.0 |
| V, wppm | 200 | 270 |
| N, wppm | 75 | 100 |
| 524° C.+, LV % | 56 | 70 |

The product was recovered and the composition thereof was determined which permitted a determination of the percent conversion of the pitch component of the feed. The results of the performance testing of Catalyst A and those of the Comparison Catalyst C are presented graphically in FIG. 1, FIG. 2 and FIG. 3. FIG. 1 presents the pitch conversion provided by the respective catalyst as a function of the catalyst age as represented by the cumulative barrels of heavy hydrocarbon feed processed per pound of catalyst. FIG. 2 presents the conversion of micro carbon residue (MCR), as determined by testing procedure ASTM D4530, as a function of the catalyst age. FIG. 3 presents the hydrogen consumption provided by the catalyst as a function of the catalyst age.

As may be observed from the figures, the inventive Catalyst A provides for a significantly higher pitch conversion than that of the comparison catalyst while requiring no significant increase in hydrogen consumption. This is an unexpected benefit in that one would expect the higher pitch conversion would cause an increase in hydrogen consumption. Also, the inventive Catalyst A provides for an MCR conversion that is no lower than, and, perhaps, slightly better than the MCR conversion of the comparison catalyst. The plots of each of the figures also show a reasonably low rate of decline in catalyst activity, thus, indicating a reasonably stable catalyst. Catalyst A exhibits the aforementioned enhanced properties despite having a low molybdenum content with a high ratio of nickel-to-molybdenum.

The results of the performance testing of Catalyst B and of the Comparison Catalyst C are presented graphically in FIG. 4, FIG. 5 and FIG. 6. FIG. 4 presents the pitch conversion provided by the respective catalyst as a function of the catalyst age as represented by the cumulative barrels of heavy hydrocarbon feed processed per pound of catalyst. FIG. 5 presents micro carbon residue conversion as a function of the catalyst age. FIG. 6 presents the hydrogen consumption provided by the catalyst as a function of the catalyst age.

The data presented in the figures indicate that Catalyst B provides both for a higher pitch conversion and a higher MCR conversion than does the Comparison Catalyst C with no significant increase in the hydrogen consumption, and, even, a slight reduction in hydrogen consumption. As noted above, it is unexpected for a catalyst to provide for a higher conversion of pitch and MCR without an increase in hydrogen consumption. The data presented in the figures also indicate a catalyst that is reasonably stable even though the reaction conditions are particularly severe. Catalyst B exhibits the aforementioned enhanced properties despite having a low molybdenum content with a high ratio of nickel-to-molybdenum.

EXAMPLE 3

This Example 3 presents the Raman spectra of the catalysts described in the above examples and the procedure by which the Raman spectra were measured.

Samples of the inventive and comparison catalysts were prepared for Raman spectroscopy by individually crushing 0.25 grams of each catalyst sample in an agate mortar and pestle and grinding for 5 minutes until the samples reached the consistency of fine flour. The homogenized sample was then pressed into a pellet using a 13 mm infrared pellet press. Raman spectra were obtained on a Horiba Jobin Yvon LabRAM Raman microscope equipped with 1800 line/mm gratings and a CCD camera. A 50× long working distance objective was employed. Spectra were excited at 488 nm with 30 mW at the sample with 10 seconds exposure time and 20 scans co-added. Samples were checked visually before and after scans to look for any evidence of laser damage.

Individual Raman spectra for Catalyst A, Catalyst B, Comparison Catalyst C and Comparison Catalyst D are shown, respectively, in FIG. 7, FIG. 8, FIG. 9, and FIG. 10. Presented in FIG. 11 for comparison are enlarged portions of the low frequency end (100 $cm^{-1}$ to 500 $cm^{-1}$) of the Raman spectra for each of the inventive and comparison catalysts. FIG. 12 presents enlarged portions of the high frequency end (1000 $cm^{-1}$ to 1800 $cm^{-1}$) of the Raman spectra for each of the inventive and comparison catalysts. FIG. 13 presents enlarged portions of the intermediate frequency (800 cm$^{-1}$ to 1000 cm$^{-1}$) of the Raman spectra for each of the inventive and comparison catalysts.

It is noted that the Raman spectra of the inventive Catalysts A and B exhibit certain Raman bands not expressed by the Comparison Catalysts thereby making their characteristic Raman spectra distinguishable over the Raman spectra of the Comparison Catalysts. For instance, each inventive catalyst exhibits at least two Raman peaks having maxima in the region of from 275 cm$^{-1}$ to 400 cm$^{-1}$, as compared to the Comparison Catalysts, which only exhibit a single Raman peak in this region. The peaks are in the Raman regions of from 290 cm$^{-1}$ to 330 cm$^{-1}$ and from 350 cm$^{-1}$ to 390 cm$^{-1}$. Also, the inventive Catalysts exhibit Raman peaks that are not exhibited by the Comparison Catalysts in the Raman regions of: from 1130 cm$^{-1}$ to 1230 cm$^{-1}$, for instance, at 1180 cm$^{-1}$; and/or from 1250 cm$^{-1}$ to 1350 cm$^{-1}$, for instance, at 1300 cm$^{-1}$; and/or from 1360 cm$^{-1}$ to 1440 cm$^{-1}$, for instance, at 1400 cm$^{-1}$; and/or from 1500 cm$^{-1}$ to 1600 cm$^{-1}$, for instance, at 1550 cm$^{-1}$; and/or from 1610 cm$^{-1}$ to 1750 cm$^{-1}$, for instance, at 1680 cm$^{-1}$. These differences in the Raman spectra demonstrate the inventive catalysts are unique over the comparison catalysts. The uniqueness of the inventive catalysts is further demonstrated by their improved catalytic performance as noted herein.

That which is claimed is:

1. A catalyst composition for use in the hydroconversion of a heavy hydrocarbon feedstock, wherein said catalyst composition comprising:
   a support material having incorporated therein:
   a molybdenum component in an amount such that it is present in said catalyst composition in an amount of from 5 wt. % to less than 12 wt. %, wherein the wt. % is based on the total weight of said catalyst composition and assuming said molybdenum component is in the oxide form regardless of its actual form; and
   a nickel component in an amount such that it is present in said catalyst composition in an amount such that said catalyst composition has a weight ratio of said nickel component-to-said molybdenum component of at least 0.28, with said weight ratio computed assuming said nickel component and said molybdenum component are each in the oxide form regardless of their actual forms;
   wherein said catalyst composition exhibits an absolute pitch conversion capability exceeding 0.16, and wherein said catalyst composition is characterized by a Raman spectrum that includes at least two Raman peaks having maxima in the Raman band range of from 275 cm$^{-1}$ to 400 cm$^{-1}$.

2. A catalyst composition as recited in claim 1, wherein said support material comprises alumina, wherein said support material has a median pore diameter in the range of from 100 Å to 140 Å and no more than 5% of its total pore volume in the pores having a pore diameter of greater than 210 Å.

3. A catalyst composition as recited in claim 2, wherein said support material has a pore size distribution width of no more than 35 Angstroms and a total pore volume of at least 0.75 cc/gram.

4. A catalyst composition as recited in claim 3, wherein said catalyst composition is further characterized by a Raman spectrum that includes a peak having its maximum in the Raman band range of from 1610 cm–1 to 1750 cm–1.

5. A catalyst composition as recited in claim 4, wherein said weight ratio of said nickel component-to-said molybdenum component exceeds 0.3.

6. A catalyst composition as recited in claim 5, wherein less than 10% of the total pore volume of said support material is contained in the pores of said support material having a pore diameter of less than 90 Å.

7. A catalyst composition as recited in claim 6, wherein said support material has a substantial absence of silica.

8. A catalyst composition as recited in claim 7, wherein said catalyst composition has a substantial absence of cobalt.

9. A process for the hydroconversion of a heavy hydrocarbon feedstock, wherein said process comprises: contacting under suitable hydroconversion conditions said heavy hydrocarbon feedstock with a catalyst composition as recited in any one of claims 1 through 3 and 4 through 8.

* * * * *